United States Patent [19]
Maeda et al.

[11] Patent Number: 5,491,683
[45] Date of Patent: Feb. 13, 1996

[54] OPTICAL INFORMATION RECORDING/REPRODUCING METHOD

[75] Inventors: Takeshi Maeda, Kokubunji; Hisataka Sugiyama; Hirofumi Sukeda, both of Kodaira; Kouichirou Wakabayashi, Kokubunji, all of Japan

[73] Assignee: Hitachi, Ltd., Tokyo, Japan

[21] Appl. No.: 360,327

[22] Filed: Dec. 21, 1994

[30] Foreign Application Priority Data

Dec. 24, 1993 [JP] Japan .................... 5-326818

[51] Int. Cl.$^6$ .................................... G11B 7/00
[52] U.S. Cl. ........................... 369/124; 359/560
[58] Field of Search .................... 369/120, 124, 369/125; 359/559, 560, 566, 569, 570, 573, 326

[56] References Cited

U.S. PATENT DOCUMENTS

| | | | |
|---|---|---|---|
| 4,282,511 | 8/1981 | Southgate et al. | 359/560 |
| 5,402,409 | 3/1995 | Kataoka et al. | 369/124 |

Primary Examiner—Loha Ben
Attorney, Agent, or Firm—Fay, Sharpe, Beall, Fagan, Minnich & McKee

[57] ABSTRACT

An optical information recording/reproducing method includes that information is recorded on a rotary disk in an optically discriminative form, a light emitted from a light source is focused on the surface of the disk to form a light spot, the information is scanned with the light spot relative thereto in a rotating direction of the disk, and a reflection light or transmitting light from the disk is collected by an optical system to record or reproduce the information. An optically discriminative first information mark having a frequency higher than a spatial frequency resolvable by the optical system is recorded on the surface of the disk, an optically discriminative second information mark having a spatial frequency component higher than that resolvable by the optical system is overwrite-recorded on the first information mark, and a frequency component which is prepared from the first and second information marks and which is higher than the spatial frequency resolvable by the optical system is converted into a spatial frequency component detectable by the optical system.

15 Claims, 11 Drawing Sheets

FIG. 3A  SPATIAL SPECTRUM OF RECORDING DATA

FIG. 3B  SPATIAL SPECTRUM DUE TO DIFFRACTION FROM DISK SURFACE

FIG. 3C  LENS APERTURE

FIG. 3D

FIG. 3E  SHIFTING BY DETECTION OPTICAL SYSTEM

FIG. 3F  AFTER SEPARATION/SYNTHESIS OF LIGHT FLUX

OPTICAL INFORMATION RECORDING/REPRODUCING METHOD

BACKGROUND OF THE INVENTION

The present invention relates to a method for optically recording and reproducing information on and from a record carrier in the form of a disk, and more particularly to a method for highly reliably reading information from minute information marks recorded at a resolution which is higher than that of an optical reproduction system.

In a conventional optical recording apparatus, the size of a recording mark is about twice the marginal size resolvable by the optical system. To explain using specified numerical values, when the wavelength of a light source was 780 nm and the numerical aperture of an objective lens was 0.55, a resolvable mark length was about 0.35 microns a mark smaller than that mark length was considered to be illegible. In a practiced apparatus, a signal from such a mark as above was so small that an approximately doubly sized (0.7 microns) mark was recorded and reproduced in consideration of an S/N of the signal.

In the field of optical microscopes, on the other hand, a method of LuRosz has been known which improves resolution of an ordinary microscope by disposing a grating in an optical system, projecting a body on the grating, disposing another grating on an image plane on which an image as a result of the projection of the grating on the body is formed, and observing an image transmitting through the latter grating. This method is, however, dedicated to constructing a microscope for forming an image of a body and needs relative movement between the latter grating and the body, failing to be applied to an optical information recording/reproducing apparatus such as an optical disk.

SUMMARY OF THE INVENTION

An object of the present invention is to provide a recording/reproducing method capable of optically reading a minute mark which has hitherto been considered not to be resolvable, and a method using the recording/reproducing method to drastically increase the recording capacity of an optical information recording/reproducing apparatus.

According to a first aspect of the present invention, first information and second information, each of which contains a smaller information mark than a size resolvable by an optical system, are calculated before they are recorded, and information as a result of the calculation is recorded on a recording medium.

According to a second aspect of the present invention, a recording medium formed with first information is used, and information is recorded on the recording medium by the aid of means for recording second information.

Reproduction which exceeds the limit of optical resolution can be effected from this recording medium by using detection means for limiting the aperture of a detection optical system, and means for detecting a signal by using a quantity of light transmitting through the detection means.

Spatial calculation of the first information and second information is performed, an angular component which is contained in the radiation angle distribution of reflecting or transmitting light from a minute mark carrying the second information and which is prevented from entering the detection optical system is so converted as to be allowed to enter the optical system, and part or all of a light quantity passing through the detection optical system is calculated, thereby making it possible to detect a minute mark which cannot be detected by the conventional method.

DESCRIPTION OF THE PREFERRED EMBODIMENTS

A radiation component which that is contained in the distribution in the radiation direction of diffraction light reflected from or transmitting through a mark, and which can enter an aperture of a detection optical system, can be detected. A radiation angle of the diffraction light is called a spatial frequency which is related to a geometrical shape of the mark through Fourier transform. Since the aperture of the detection optical system is finite, detectable spatial frequency components are limited and consequently, only a mark of limited size can be detected. As the size of the mark shape is further decreased for increasing density, the radiation angle of reflecting or transmitting light from the mark is spread and the mark shape cannot be recognized by a light quantity entering the aperture of the detection optical system.

Accordingly, in the present invention, a radiation angle component spread owing to an increase in density is allowed to enter the aperture of the detection optical system to ensure that a minute mark is detected.

To this end, a second information mark having a different spatial frequency from that of a first information mark is formed on the surface of a disk in advance, and the first information mark is overwritten on the second information mark.

Figure 1A:
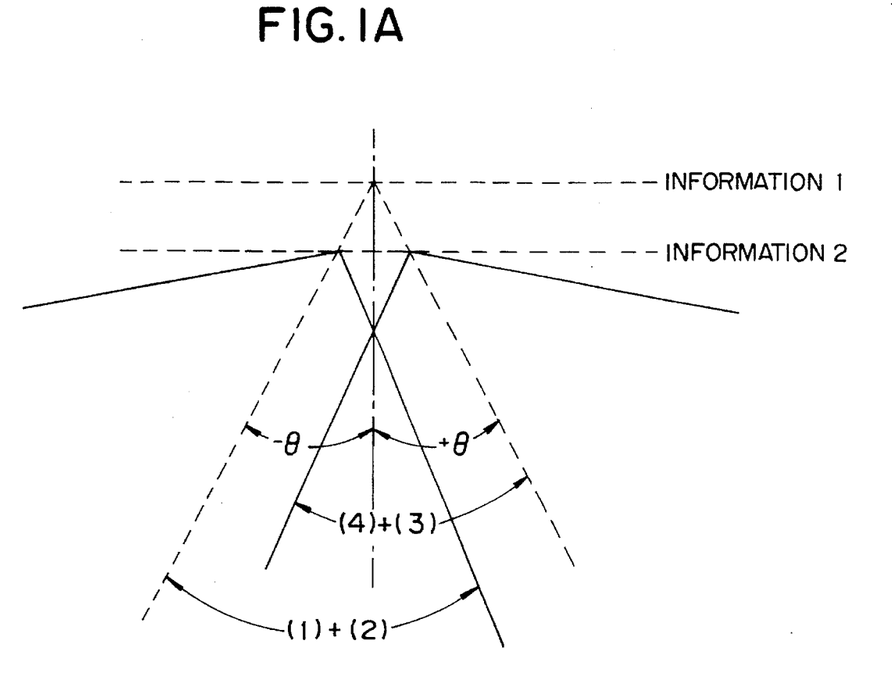
FIGS. 1A and 1B are diagrams useful to explain the spectrum distribution in the present invention.
Figure 1B:
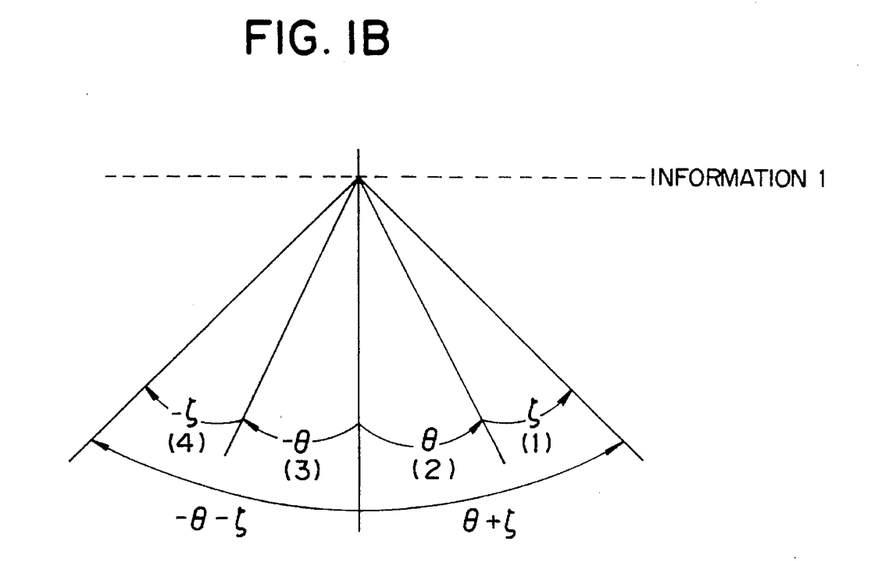

Referring now to FIG. 1, the principle of the present invention will be described. It is assumed that a first information mark has a spatial frequency of F1 and a second information mark has a spatial frequency of F2. When overwrite of the two marks is effected, the product of the spatial frequencies F1 and F2 of the marks is calculated. Consequently, a spatial frequency of a mark resulting from overwrite recording generates four components: F1–F2, F1+F2, −F1+F2 and −F1−F2. Light incident on the mark having the above spatial frequency components is diffracted and radiated. Generally, the radiation angle is correspondingly related to the spatial frequency of the mark. This condition is shown in FIGS. 1A and 1B.

The radiation angle corresponding to F1 will now be considered by dividing it into four components having ranges of radiation angle as shown in FIG. 1, that is, a component within a range between radiation angles $+\theta+\xi$ to $+\theta$) (1)

a component within a range between radiation angles $+\theta$ to 0  (2)

a component within a range between radiation angles $-\theta$ and 0 (3)

a component within a range between radiation angles $-\theta-\xi$ to $-(\theta)$. (4)

As shown in FIG. 1A, it is assumed that the radiation angle corresponding to F2 is $\theta$ and the aperture of the detection optical system falls within a range of $\pm\theta$ as indicated by dotted lines. As a result of overwrite of the two marks, the above spatial frequency components are generated, and of them, a radiation angle component (3)+(4) corresponding to F1+F2 and a radiation angle component (1)+(2) corresponding to F1−F2 are allowed to enter the aperture. In other words, all of the spatial frequency components owned by the first information mark can be detected. The ± sign (polarity) described herein indicates the direction of diffraction light. A negative region of spatial frequency indicates a direction of diffraction light in which the diffraction light is radiated to the left as shown in FIG. 1A.

Figure 2:
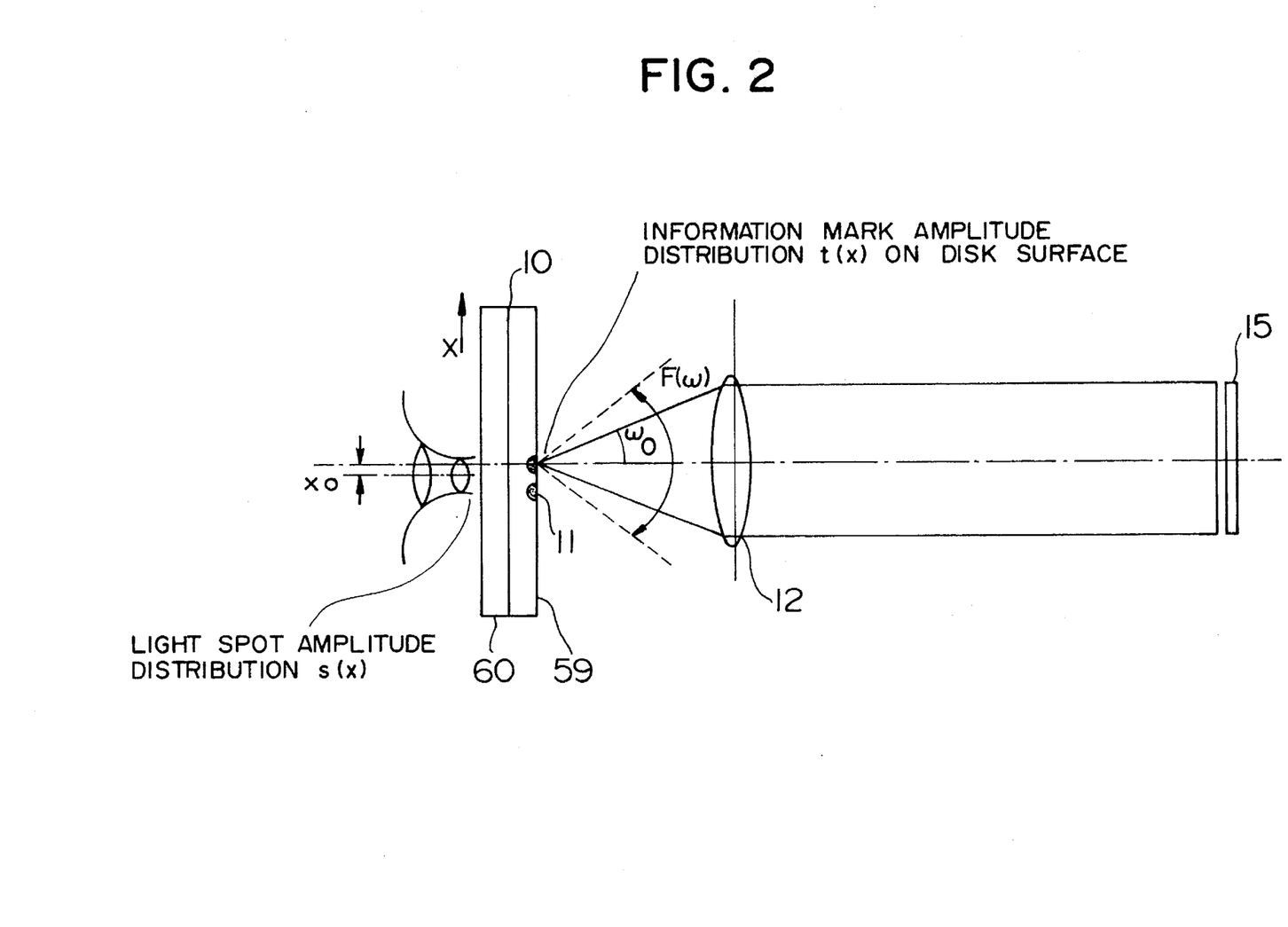
FIG. 2 is a diagram showing the construction of a detection optical system according to the present invention.

A concrete example of detection of a minute mark will be described with reference to FIG. 2. The signal detection system for the optical disk is herein represented by a simple one-dimensional model. A beam focused on a disk 10 essentially comprised of a recording layer 59 and a carrier layer 60 is irradiated. The structure of the disk will be detailed hereinafter with reference to FIGS. 6A, 6B and 9. Radiation light reflected from or transmitting through a recording mark 11 on the disk 10 enters an objective lens 12 and passes therethrough so as to be led onto the surface of a photodetector 15. The light quantity distribution is integrated on the photodetector surface to provide a detection signal. Alternatively, as will be described with reference to FIG. 4, a small aperture 104 may be disposed on the image forming plane, and light transmitting through the aperture may be detected as a signal.

FIGS. 3A to 3F show conversion states on a spatial spectrum. An optical amplitude characteristic obtained after overwrite of the recording mark 11 and a light spot is represented by f(x) by using the displacement x on the disk surface. With an angular variable of radiation light defined as $\omega$, the radiation angle distribution is represented by F($\omega$) which is the Fourier transform of f(x). On the assumption that coherent light which has passed through the objective lens 12 is led to the detector 15, displacement on the photodetector surface is proportional to the radiation angle. For a radiation angle $\omega$o indicative of an aperture of the objective lens, the distribution of light which has passed through the objective lens is expressed by F($\omega$)P$\omega$o($\omega$), where $$P\omega_0(\omega) = \begin{matrix} 1(|\omega/\omega_0| \leq 1) \\ 0(|\omega/\omega_0| > 1) \end{matrix} \quad (1)$$

Accordingly, if the total quantity of light passing through the aperture is detected on the photodetector surface, a detection signal g(xo) at displacement xo can be obtained by integrating the aforementioned distribution of light. Where the distribution of amplitude of a light spot is s(x) and the distribution of amplitude of marks on the disk surface is t(x), $$f(x)=s(x)t(x) \quad (2)$$

stands.

Accordingly, by using the Fourier transform S($\omega$) of s(x) and the Fourier transform T($\omega$) of t(x), the radiation angle distribution F($\omega$) can be expressed by $$F(\omega)=S(\omega)*T(\omega) \quad (3)$$

where * indicates convolution.

The optical amplitude characteristic fo(x) and radiation angle distribution Fo($\omega$) obtained after overwrite of the recording mark and the light spot under the condition that positions of the spot and mark shift from each other by xo are expressed by $$f_o(x)=s(x)t(x-x_0)$$

$$F_0(\omega)=S(\omega)*T(\omega)\exp(-j\omega X_0). \quad (4)$$

In connection with the amplitude t(x) of marks on the disk surface, a mark having an amplitude of $t_2(x)$ is recorded in advance and an information mark having an amplitude of $t_1(x)$ is recorded on the former mark. Then, $$t(x)=t_1(x)t_2(x)$$

$$T(\omega)=T_1(\omega)*T_2(\omega) \quad (5)$$

and when a cosine wave is taken as $t_2(x)$, there result $$t_2(x)=\cos(\omega_1 x)$$

$$T_2(\omega)=\tfrac{1}{2}[\delta(\omega+\omega_1)+\delta(\omega-\omega_1)]$$

$$T(\omega)=\tfrac{1}{2}[T_1(\omega+\omega_1)+T_1(\omega-\omega_1)].$$

In the process of passage of this distribution through the objective lens, only a part of the distribution which is a spatial frequency $\omega$o is allowed to pass. But, aliasing of positive and negative frequency spectra of the spatial spectrum of recording data exists in the partial spatial frequency $\omega$o (see FIG. 3D). In order to obtain a spectrum owned by the original information mark from the aliasing, the information spectrum Fo($\omega$)P$\omega$o($\omega$) having passed through the objective lens is subjected to convolution on the spatial frequency by a spatial filter having a spatial frequency characteristic similar to $T_2(\omega)$. In the present embodiment, by noticing that the aforementioned filter can be expressed by a delta function and using such a nature that convolution of the delta function by a desired function is equivalent to coordinate conversion of the desired function, the flux of light having passed through the objective lens is shifted by a displacement corresponding to spatial frequency $w_1$ and irradiated on the photodetector surface in consideration of the fact that the spatial frequency corresponds to positions on the objective lens surface. The optical system can be constructed using a prism as shown in FIG. 4 or a diffraction grating.

Figure 3A:
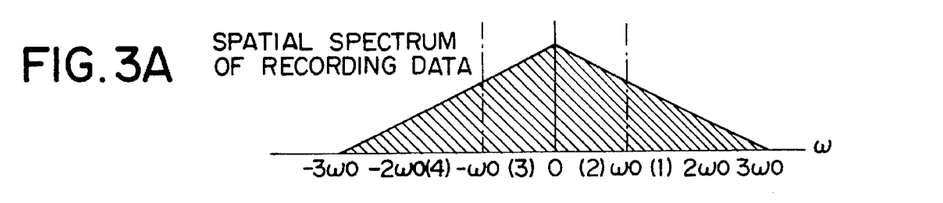
FIGS. 3A to 3F are diagrams useful to explain the behavior of conversion of a spatial spectrum.
Figure 3B:
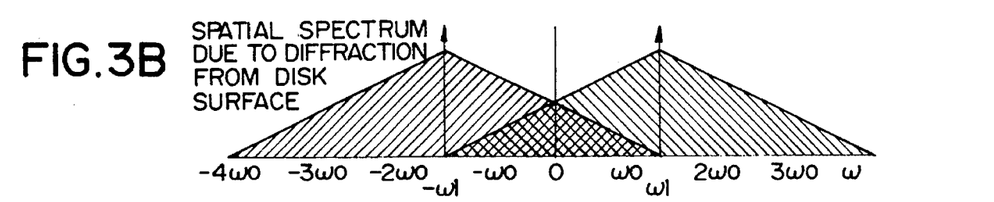
Figure 3C:
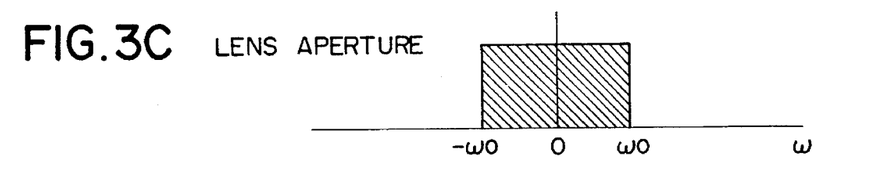
Figure 3D:
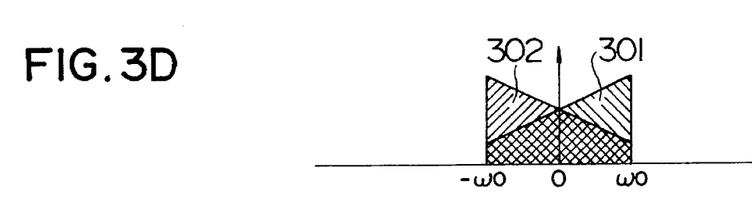
Figure 3E:
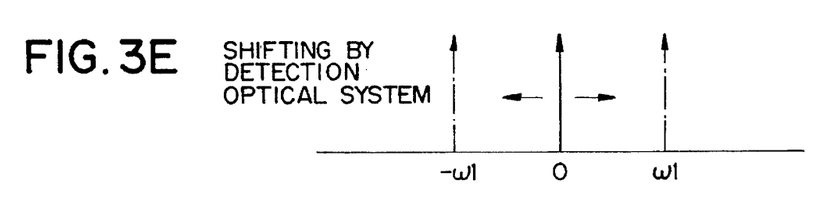
Figure 3F:
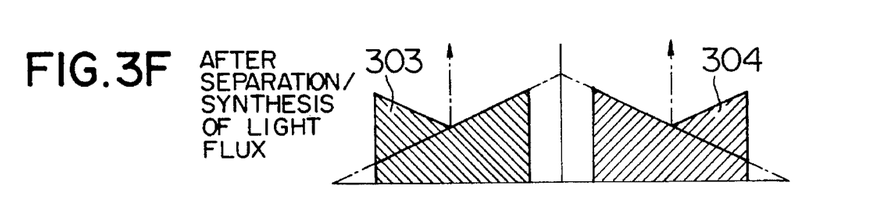
Figure 4:
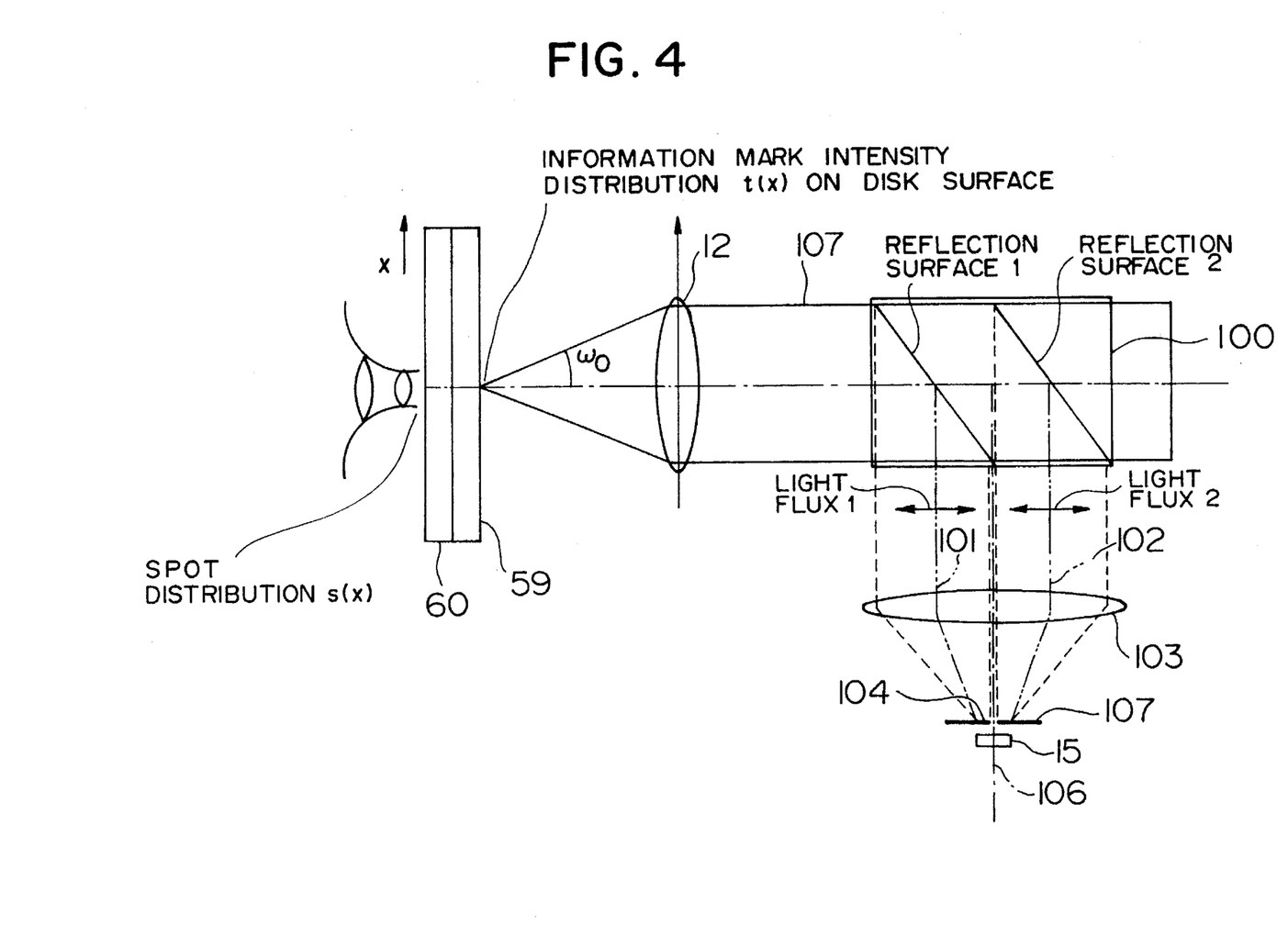
FIG. 4 is a diagram showing the construction of an improved optical system according to the present invention.

FIGS. 3A to 3F show the concept of the aforementioned conversion on the spatial spectrum. As shown in FIG. 3A, the spatial spectrum of recording data exceeds a band width $\omega$o (FIG. 3C) which is allowed to pass through the lens aperture. Accordingly, the spatial spectrum is caused to interfere with a grating having a repetition period of spatial frequency $\omega$1 which is higher than $\omega$o on the disk surface, so that the spatial spectrum distribution of light radiated from the disk surface to the objective lens can be widened as shown in FIG. 3B. In the process of passage of this distribution through the objective lens, only a part of the distribution which is a spatial frequency band $\omega o$ is allowed to pass. But aliasing of positive frequency spectrum 302 and negative frequency spectrum 301 in the spatial spectrum of recording data exists in the spatial frequency band $\omega o$ (FIG. 3D). By shifting this spatial spectrum by the spatial frequency $\omega_1$ on the frequency axis (FIG. 3E), a spatial spectrum of recording data can eventually be restructured on the photodetector surface as shown in FIG. 3F.

Figure 10:
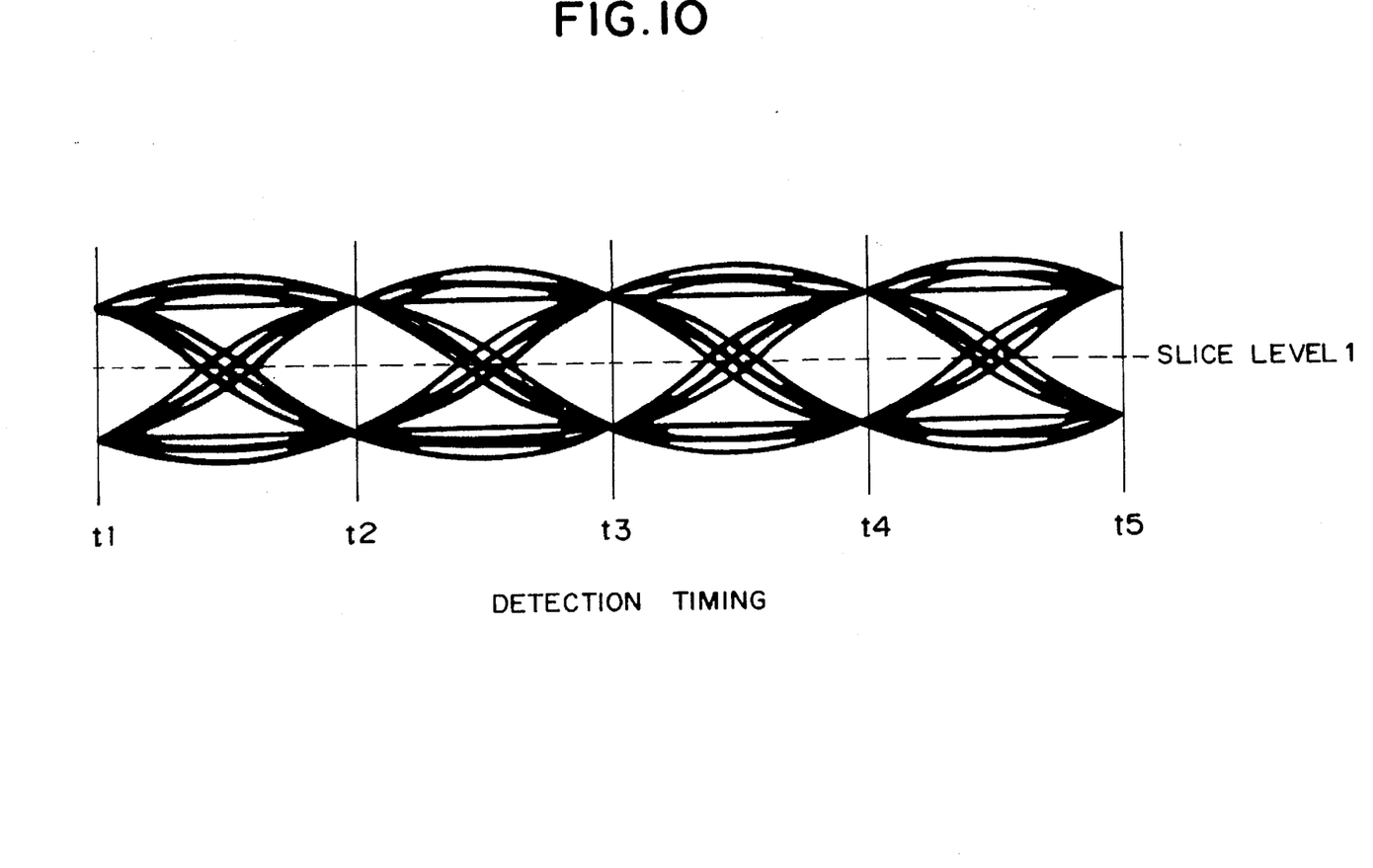
FIG. 10 is a waveform diagram for explaining the principle of reproduction according to the present invention.

But the superfluous aliasing of the positive and negative frequency spectra of the recording data still remains as indicated at 303 and 304. These components disturb detection of a waveform of recording data as it is but when recording data is given regularity, the spatial spectrum undergoing the aliasing is also given regularity. Therefore, if the regularity is known of the overwrite of the recording data spectrum and the spatial spectrum undergoing the aliasing, then detection of data will not be affected adversely even in the presence of the spectrum undergoing the aliasing. When the regularity as above is given by expressing data in the form of the presence or absence of the binary rectangular pulse at a repetition period of a specified interval, a detection signal obtained with the conventional method takes a waveform which, as shown in FIG. 10, a transition between two levels analogous to the recording data. In this case, information is detected by determining which one of the levels above and below a slice level coincides with the level of a signal at each detection timing point t1, t2, t3, t4 or t5. The above detection timing is synchronous with the repetition period of the specified interval.

Figure 11:
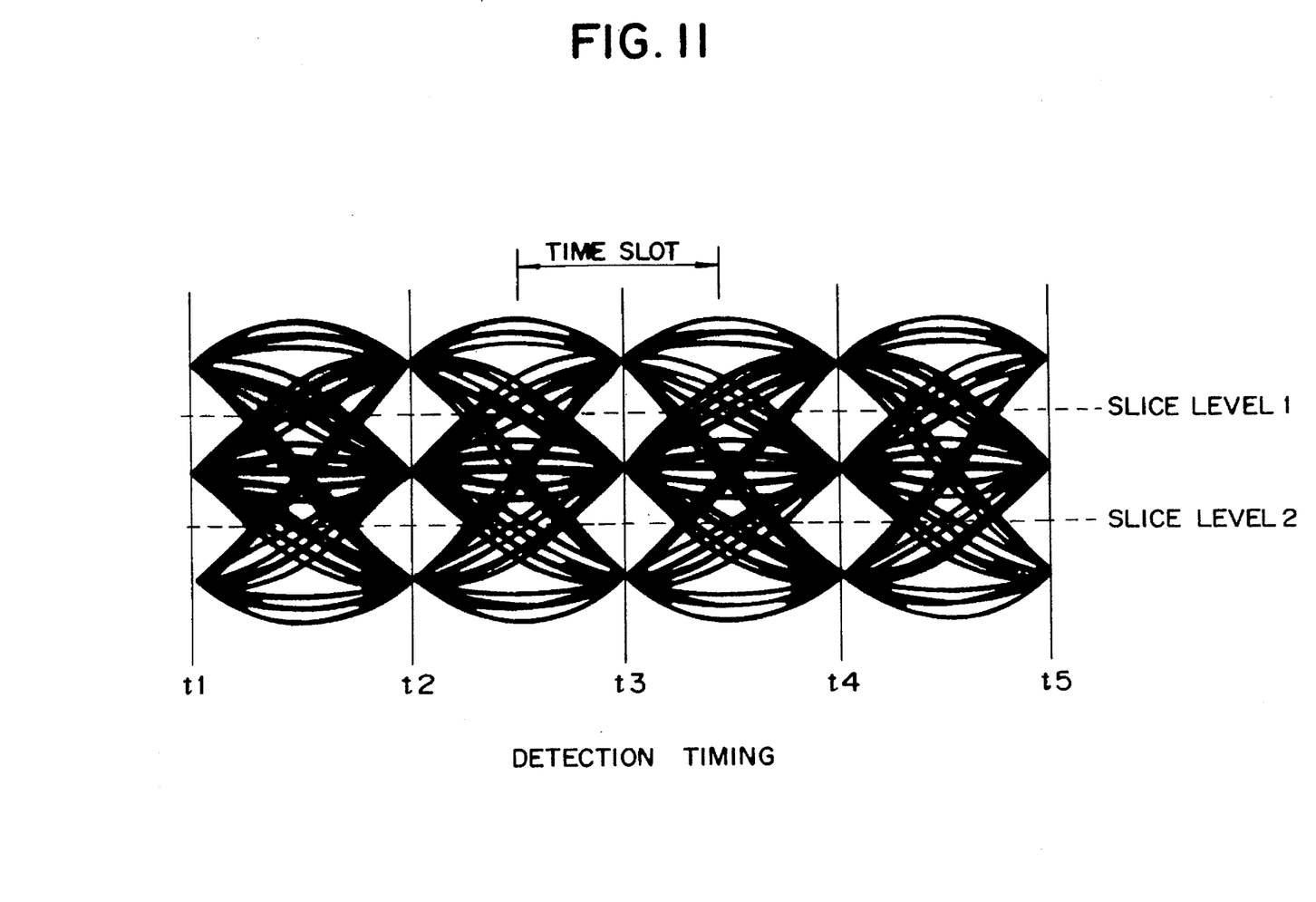
FIG. 11 is a waveform diagram that is also useful to explain the principle of reproduction according to the present invention.

However, the product of the two information components recorded according to the present invention, has a different waveform from the recording data (second information) and is affected by the spectrum undergoing the aliasing having regularity at the respective sampling points at the repetitive period to take multi-value levels. The waveform can be exemplified as a tertiary waveform as shown in FIG. 11. The recording mark originally takes only the two states of the presence and absence of mark, but is affected by the spectrum undergoing the aliasing to provide a combination of waveforms having various amplitudes and frequencies as shown in FIG. 11. Accordingly, a signal amplitude at a detection timing synchronous with the repetition period of the specified interval for recording data is decided at that timing depending upon which one of three values the signal amplitude equals (that is, as to whether the signal amplitude is above slice level 1, is between slice levels 1 and 2 or is below the slice level 2). Since the correspondence relation between a change in tertiary level and the information mark is known in advance for the respective detection timings, the recording information can be demodulated.

In another method, regularity affected by the spectrum undergoing the aliasing can be realized with displacement of positions of pulses at specified intervals (phase shift on the time axis), without resort to the multi-level. Further, regularity may be given in which the signal waveform is changed on the basis of the multi-level and phase. Generally, a method called multi-value phase shift keying has been known as a modulation method which can make the best of the information capacity transmittable in a communication path of limited band. More specifically, in that method, information is transmitted in the form of changes in amplitude and phase of a signal waveform.

Since the ordinary transmission path characteristic has a large dynamic range for signal amplitude and is linear, a transmitting waveform can be transmitted as it is. But recording and reproduction, and especially recording on an optical disk, is non-linear, and the range within which the amplitude is allowed to change is narrow. Therefore, the expedience for the communication path as it is cannot be applied to the recording and reproduction using an optical disk.

To have knowledge of the waveform, a concrete recording pattern is considered as follows:

$$t_2(x) = 1 + a\cos(\omega_1 x) \qquad (6)$$
$$= 1 + (a/2)(\exp(j\omega_1 x) + \exp(-j\omega_1 x))$$

where a is the amplitude, the grating used is of variable-density type, and and spatial frequency is $\omega 1$. Then, there results, $$T_2(\omega) = \delta(\omega) + a/2[\delta(\omega+\omega_1) + \delta(\omega-\omega_1)] \qquad (7).$$

For simplification of calculation, it is assumed that $t_1(x)$ is representative of an array in which identical recording patterns are recorded on the disk at a repetition period of 2p. When the light source of the optical system has a waveform of $\lambda$ and the numerical aperture is NA, p is given by $$p = \lambda/NA \qquad (8)$$

and for $$\omega_o = 2\pi/p = \pi 2NA/\lambda \qquad (9)$$

$t_1(x)$ can be expressed in terms of a Fourier series as follows:

$$t_1(x) = \Sigma R_1(m)\exp(j\pi mx/p)$$

where Fourier coefficient $R_1(m)$ is given by $$R_1(m) = (\tfrac{1}{2})p\int t_1(x)\exp(-j\pi mx/p)dx;$$

For the convenience of the succeeding study, a coefficient R1'(m) is determined when the isolated pulse shifts by x1 from the original as follows:

$$R_1'(m) = R_1(m)\exp(j\pi mx_1/p)$$

and then $$t_1(x-x_1) = \Sigma R_1'(m)\exp(j\pi mx/p)$$

stands.

Thus, $t_2(x)$ expressed in terms of a Fourier series is of m-th order and has only coefficients of ±4-th order. The product $t(x)$ of $t_1(x)$ and $t_2(x)$ is expressed in terms of a Fourier series as follows:

$$t(x) = \Sigma R(n)\exp(j\pi nx/p) \qquad (10)$$

$$R(n) = R_1'(n) + (a/2)(R_1'(n-4) + R_1'(n+4)) \qquad (11).$$

Through the expression of Fourier series, the distribution of light quantity on the objective lens surface can be expressed by superimposition of diffraction light components corresponding to the individual Fourier coefficients as follows:

$$F_0(\omega) = \Sigma \exp(-j\pi nx_o/p)R(n)S(\omega-n/2p)$$

It will be seen from this expression that when normalized by $\omega o$, an n-th order diffraction light component Fo(n) has a distribution center at n/2 on the objective lens, the distribution spreads about the center within a range of ±1, and the diffraction component has Fourier coefficients exp(-jπnxo/ p)R(n) as complex amplitudes. As a result, the centers of diffraction light components of higher order depart from the original and are outside the aperture of the objective lens. Accordingly, the present calculation is carried out up to diffraction light components of ±3rd order which can pass through the aperture.

The intensity distribution $I(\omega)$ on the photodetector surface can by expressed by the product of the complex amplitude distribution $Fo(\omega)$ and its conjugate complex amplitude as follows:

$$I(\omega) = \Sigma\Sigma\exp(j\pi(n-n')x_0/p) \times \qquad (12)$$
$$R(n)R^*(n') \times$$
$$S(\omega - n/2p)S^*(\omega - n'/2p)$$

where * represents the conjugate complex.

The signal $g(x_0)$ from the light receiver is obtained by integrating values at individual points on the photodetector surface over the entire surface of the detector as follows:

$$g(x_0)=\int I(\omega)d\omega \qquad (13)$$

In the above equation, the integration calculation can be facilitated by making $s(\omega-n/2p)S^*(\omega n'/2p)$ have a constant value regardless of $\omega$. When an area in which the distribution of one order superimposes on the distribution of another order is expressed by $A(n, n')$, the value of A is determined for combinations of orders of n and n' which affect the integrating calculation. By normalizing the size of the area for superimposition by the maximum value, Table 1 is obtained.

TABLE 1

| (n', n) | −3 | −2 | −1 | 0 | 1 | 2 | 3 |
|---|---|---|---|---|---|---|---|
| −3 | 0.25 | 0.25 | 0.25 | 0.25 | 0 | 0 | 0 |
| −2 | 0.25 | 0.5 | 0.5 | 0.5 | 0.25 | 0 | 0 |
| −1 | 0.25 | 0.5 | 0.75 | 0.75 | 0.5 | 0.25 | 0 |
| 0 | 0.25 | 0.5 | 0.75 | 1.0 | 0.75 | 0.5 | 0.25 |
| 1 | 0 | 0.25 | 0.5 | 0.75 | 0.75 | 0.5 | 0.25 |
| 2 | 0 | 0 | 0.25 | 0.5 | 0.5 | 0.5 | 0.25 |
| 3 | 0 | 0 | 0 | 0.25 | 0.25 | 0.25 | 0.25 |

In the above Table, there is no need of considering a combination of n' and n for making A zero.

Frequency components of an output signal obtained from the detector while the light spot is moving can be known from equation 12. The term of $\exp(j\pi(n-n')x_0/p)$ corresponds to the frequency and in the term, $2p/(n-n')$ represents the period.

Because of the condition of the superimposition of diffraction light components, n–n' is allowed to take only values of from 0 to ±3 and hence even the highest frequency is a frequency corresponding to a period equaling a length of 2p/3 on the disk surface, which frequency is detectable even with the conventional detection optical system. However, in the present method, components of diffraction light representative of high spatial components are superimposed complicatedly to form the amplitude of conventionally detectable low frequency components, thereby ensuring that high spatial frequency components can be transmitted. Accordingly, a mark array having high spatial frequency components is allowed to correspond to a detection signal waveform generated by synthesizing amplitudes of low frequency components. The aforementioned method for multi-value level phase shift is suitable as a method for making the correspondence.

FIG. 4 shows another embodiment of the present invention. Available as a method for hyper-resolution is a confocal detection method which is well known in the field of laser microscopy. In the above detection method, the detection area is limited by disposing a pinhole 104 on an image forming plane 107 of an objective lens 12, and the resolution of the laser microscope is improved by receiving light transmitting through the pinhole. In the present invention, the superimposition of the carrier layer 60 and recording layer 59 permits an image to be transmitted onto the image plane. Therefore, by performing confocal detection by disposing the pinhole 104 on the image forming plane 107 of the objective lens 12, the effect of the present invention can be emphasized to drastically improve the resolution.

Referring now to FIG. 4, coherent light flux 107 passing through the objective lens 12 is inputted to a light flux separating/synthesizing element 100. In the synthesizing element 100, the transmitting light flux is reflected by a reflection surface 1 having a reflection factor r1 to provide light flux 1 directed to an image forming lens 103. The transmitting light is also reflected by a reflection surface 2 having a reflection factor r2 to provide light flux 2 directed to the image forming lens. The reflection surfaces 1 and 2 are set so that a center axis 101 of the light flux 1 and a center axis 102 of the light flux 2 may be positioned in relation to a center axis 106 of the image forming lens so as to be spaced apart therefrom by distances corresponding to ±1 in terms of spatial frequency. The light flux 1 and light flux 2 are focused on the pinhole 104 by means of the image forming lens 103, and the light spot on the small area on the image forming plane represented by the pinhole 104 is detected by means of a detector 15. To combine light quantities of the light flux 1 and light flux 2, setting is carried out to satisfy $$r1=r2(1-r1) \qquad (15)$$

The foregoing embodiments have been described by referring to an instance wherein the first information is set up on the disk surface in advance and the second information is overwrite-recorded on the first information. In these embodiments, non-linearity of the recording medium is predominant and the embodiments are suitable for a medium which cannot perform multi-value recording, but, in the case where the recording medium is a medium capable of performing multi-value recording, first information and second information can be calculated in advance on a recording signal and results of calculation can be recorded on the disk surface.

Figure 5:
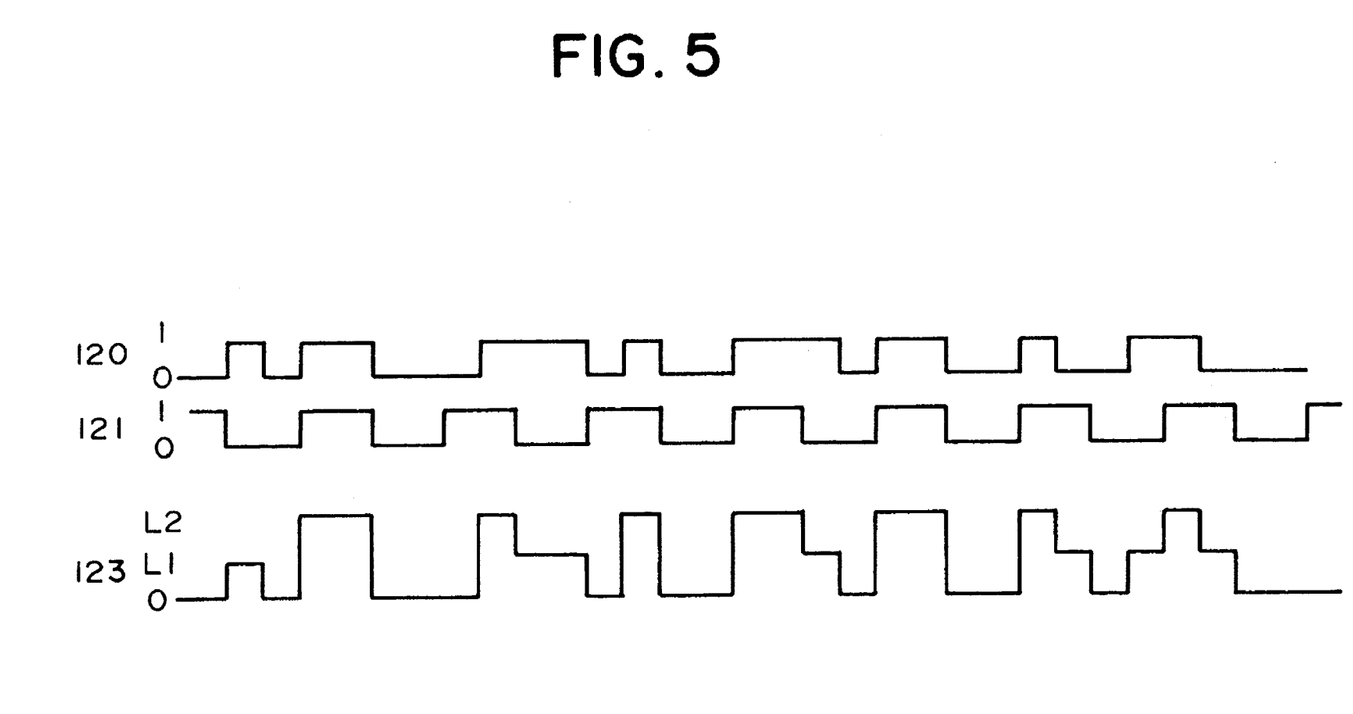
FIG. 5 is a waveform diagram for explaining another embodiment of the present invention.

FIG. 5 shows an example of a calculation method. For example, a time waveform of first information 121 is multiplied by a time waveform of second information 120. In each of the waveforms 120 and 121, which are indicative of signals of logical levels, "0" and "1" correspond to levels L1 and L2, respectively, and the product of the waveforms 120 and 121 is a product signal 123. This signal has tertiary levels and therefore it is used to effect recording on a medium capable of recording multi-values. Thus, a reproduction signal can be obtained which has a waveform enjoying effects similar to those described in connection with the foregoing embodiments of the present invention.

Figure 6A:
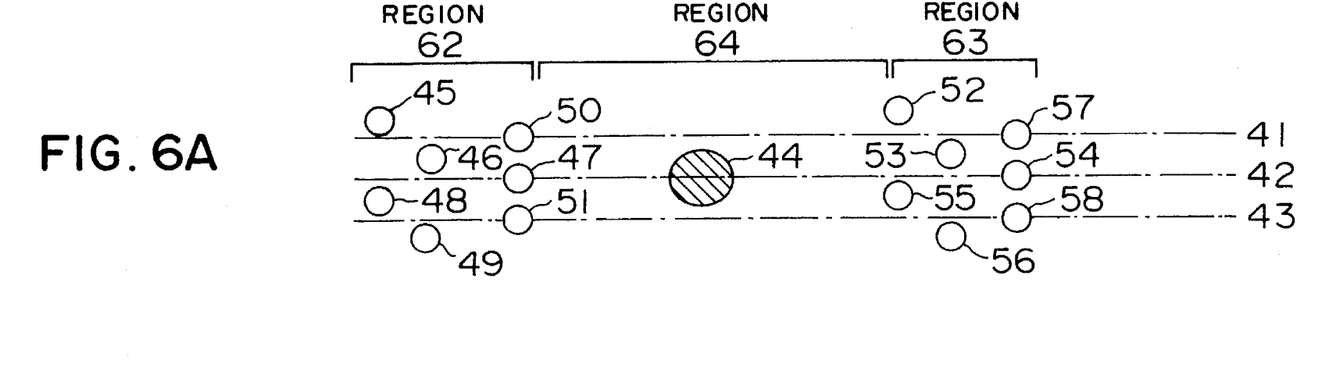
FIGS. 6A and 6B are diagrams for explaining a disk structure of the present invention.
Figure 6B:
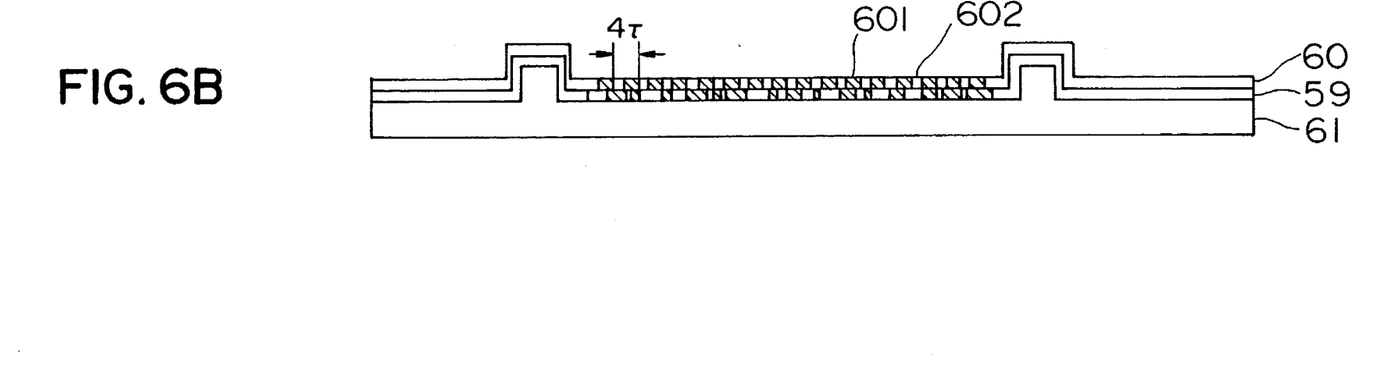

Referring to FIGS. 6A and 6B, a method for preparing a concrete carrier layer according to the present invention will be described. FIG. 6A is a plan view, as seen from above the disk surface, showing the relation between a spot 44 and a pre-pit array. Pre-pits 45, 46, 48 and 49 in rugged form are arranged in a direction transverse to the travel direction of the light spot to sandwich track center lines 41, 42 and 43. Pre-pits 47, 50 and 51 lie on the track center lines. Regions 62 and 63 each including a group of the pre-pits as above are arranged at constant intervals on the circumferentially extending tracks.

Of these pre-pits, for example, the pre-pits 45 and 46 are used to detect a positional error of the light spot 44, thereby positioning the light spot 44 onto the track center 41. This method is a known sampled servo method and will not be detailed herein. The sampled servo method used in the present invention is advantageous in that the pits arranged on both sides of one track to detect a tracking error are positioned differently from each other in the travel direction of the light spot in order that the polarity of a tracking error detection signal for one track and the polarity of a tracking error detection signal for the adjacent track are inverted with respect to each other. For example, pits 47 and 54 are used to generate a clock signal synchronous to the pits. This method is similar to a clock generation method in the sampled servo method. A signal is recorded on the carrier layer 60 in accordance with this clock.

FIG. 6B is a longitudinal sectional view of the disk taken along the track center line. The carrier layer 60 and recording layer 59 are laminated on a substrate 61 formed with the rugged pre-pits.

Figure 7:
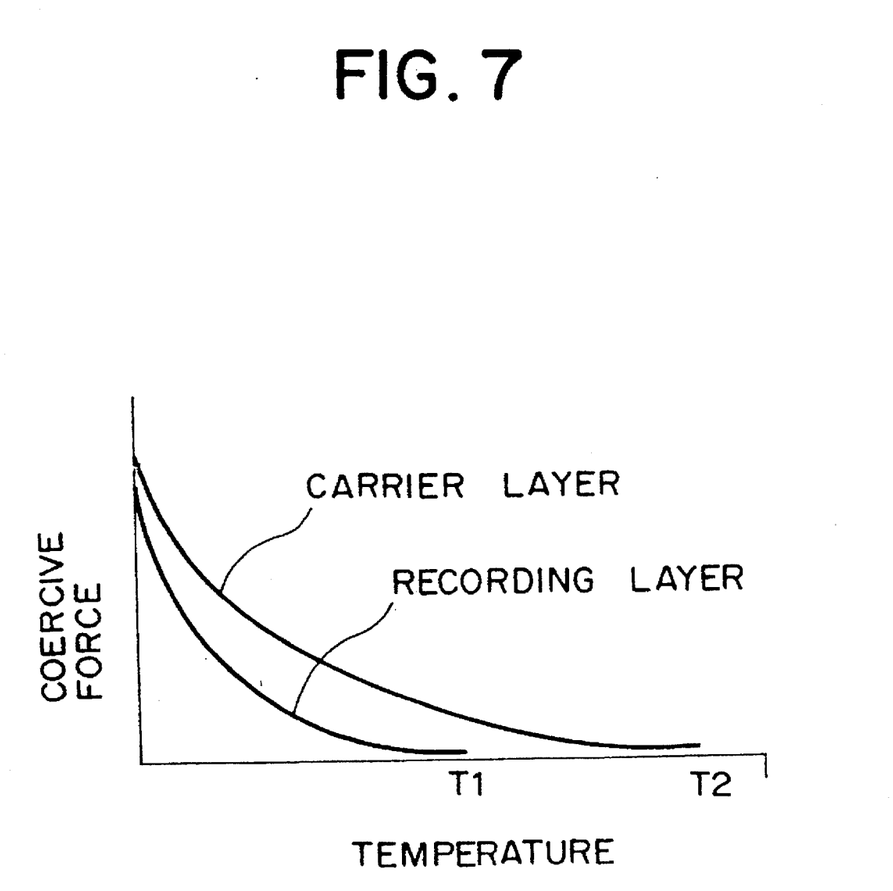
FIG. 7 is a graph useful to explain magnetic characteristics of an optomagnetic medium of the present invention.

FIG. 7 shows the relation between magnetic characteristics of the carrier layer 60 and recording layer 59.

The manner of overwriting marks on the carrier layer 60 and recording layer 59 will be described. Firstly, the clock is generated from the pre-pits 47 and 54 and a repetitive synchronizing pattern of a period $4t$ corresponding to the spatial frequency $\omega 1$ is recorded on the carrier layer 60 by using the clock. For recording at that time, the recording temperature is raised to a Curie point T2 or more to effect optomagnetic recording. As shown at 601 and 602 in FIG. 6B, regions of differently magnetized states are formed, with the result that an information mark of the spatial frequency $\omega 1$ is recorded. Information having a spatial frequency component higher than $\omega 1$ is recorded on the mark at a recording temperature which is between Curie points T1 and T2.

A circuit for generation of the clock for recording can also be used for reproduction. An optical system for this purpose may be constructed as shown in FIG. 2, dispensing with the light flux separating element. The entirety of light passing through the objective lens is received by the photodetector so as to be converted into an electrical signal.

Figure 8:
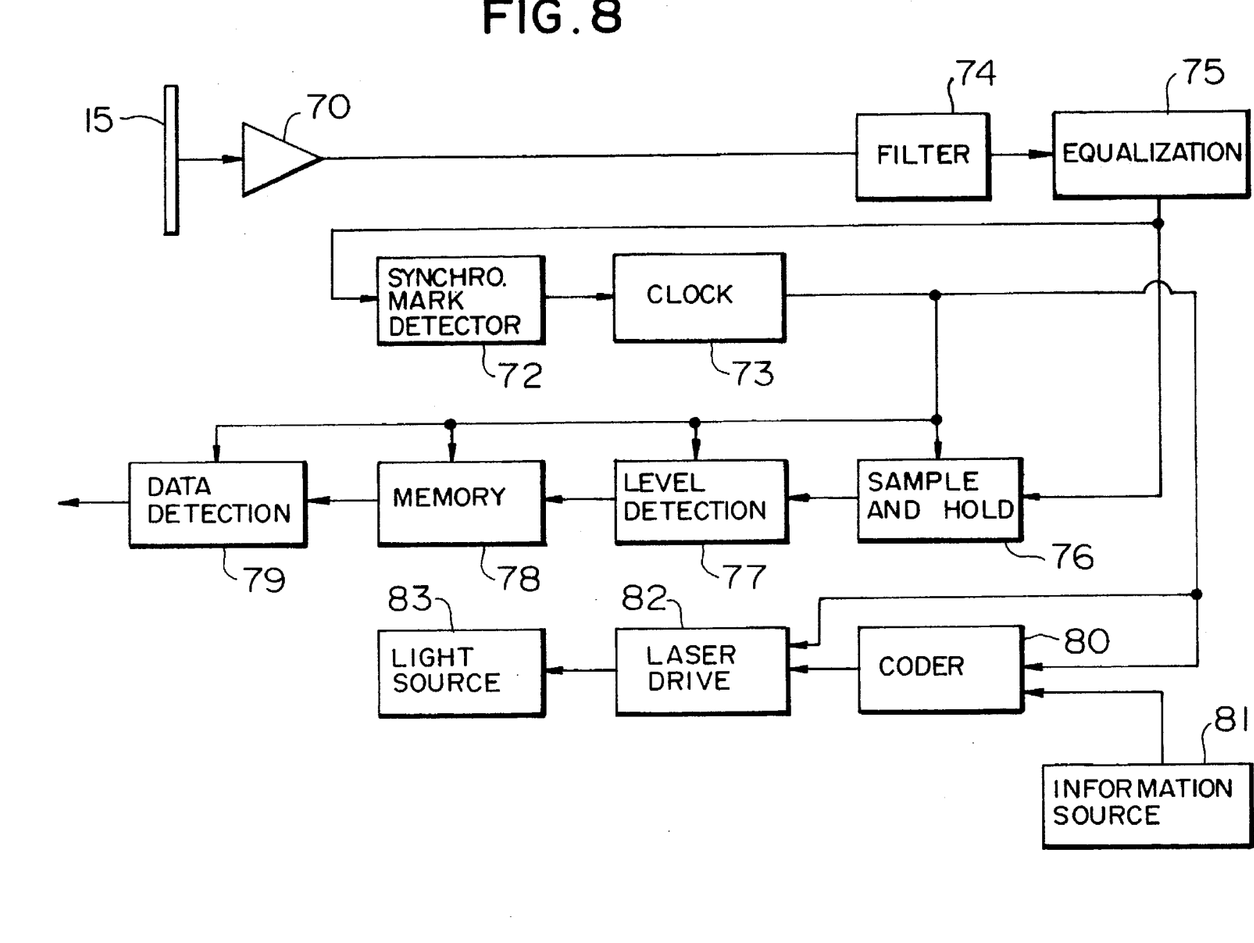
FIG. 8 is a block diagram of a reproduction signal processing system of the present invention.

FIG. 8 shows a signal processing system used in the present invention. An output from the photodetector 15 is amplified by an amplifier 70 to a suitable level and a resulting signal is passed through a filter 74 so as to be removed of unwanted noise and inputted to a synchronizing mark detector 72 and a sample/hold circuit 76 through a waveform equalizer 75. A timing of a synchronizing mark is detected by the circuit 72 for detection of the synchronizing mark for clock generation contained in the pre-pit group and inputted to a clock generator 73. A clock signal generated from the clock generator 73 is used in order for the sample/hold circuit 76 to detect output signals from the amplifier 70 at individual sampling points.

Then, a level detector 77 decides which permissible level at a sampling point the signal takes. Levels detected at the respective sampling points are stored in a memory 78 in synchronism with the clock, and a data detector 79 demodulates the stored levels to an original data array in accordance with changes in signal level at respective sampling points. In recording, a signal from an information source 81 is coded by a coder 80 by using a signal from the clock generator 73, and a light source 83 is modulated in intensity through a laser drive waveform generator 82.

In the foregoing embodiments, the carrier layer is formed of an optomagnetic recording film and tracks must be formed one by one.

Figure 9:
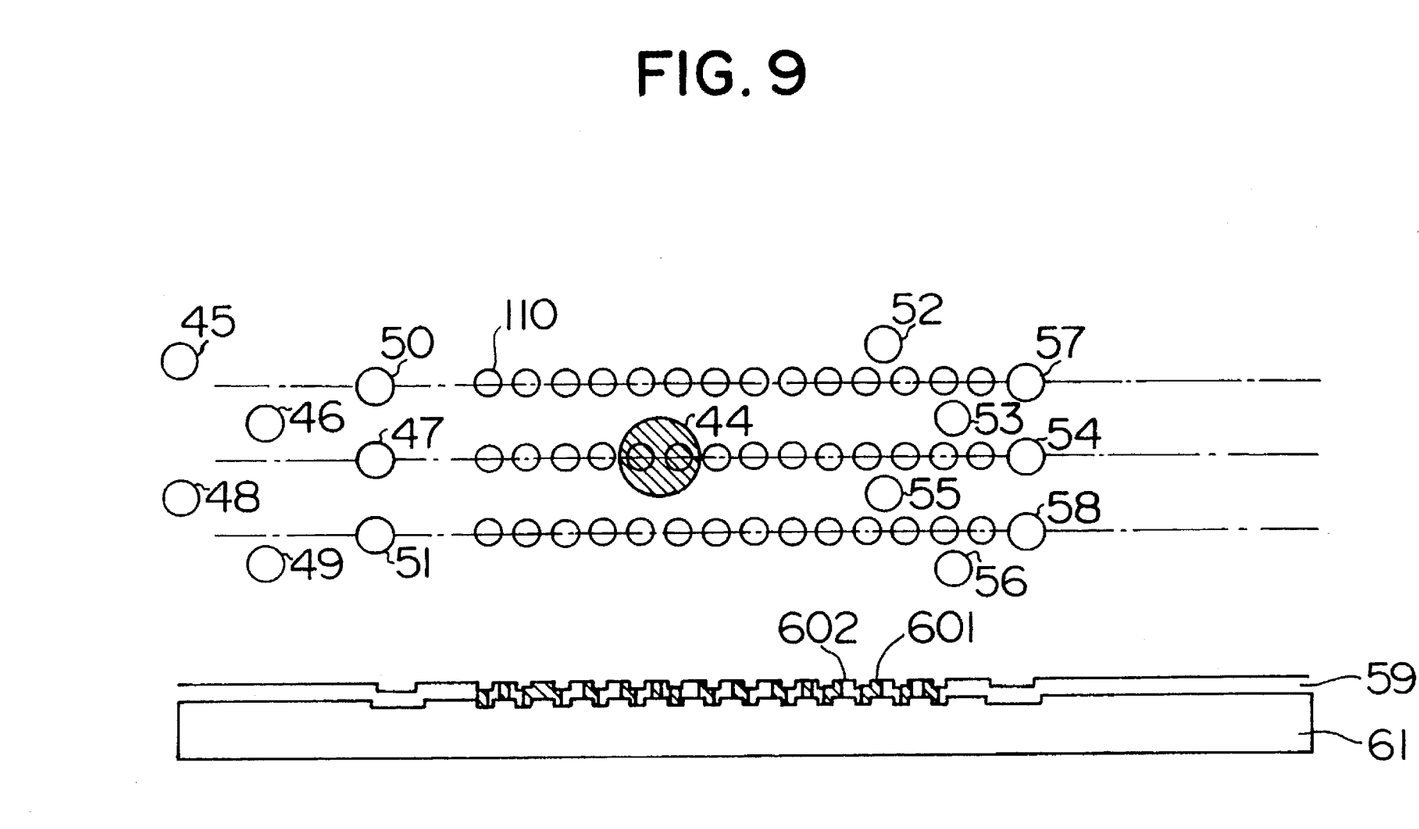
FIG. 9 is a diagram for explaining another disk structure of the present invention.

FIG. 9 shows an example in which similar pre-pits are formed by stamping. A pit array of pits 110 corresponding to the spatial frequency $\omega 1$ is recorded between a group of pre-pits 45 to 51 and a group of pre-pits 52 to 58 and transferred to a substrate 61, to provide a rugged pattern thereon by using an ordinary process such as replica. When an ordinary optomagnetic disk recording film, write-once type recording film or phase change type recording film 59 is applied on the pattern, information can be recorded in accordance with a change 601 or 602 in magnetized state.

While in the foregoing embodiments only one track is described, second information may be overwritten on first information, which is made to be different for adjacent tracks, in order that the amount of interference between adjacent tracks can be reduced on a detected spatial spectrum and the inter-track spacing can be reduced. Further, in the foregoing embodiments, the first information is recorded on only one layer, but by using a multiple layer and making the information frequency different for each layer, interference between respective layers can be reduced and multi-layer recording can be carried out to increase the capacity of the recording medium.

According to the present invention, a minute mark can be detected. Specifically, when the wavelength of the reproduction light source is 780nm and the numerical aperture of the objective lens is 0.55, the cut-off optical spatial frequency is 1410/ mm and the minimum mark length is 3.5 μm. Incidentally, according to the present invention, by choosing the grating period of the carrier layer for the aforementioned cut-off frequency, doubling the width of the recording signal band, and using an objective lens having an aperture equal to the wavelength, a minute mark of 0.18 μm or less can be detected in a direction of line density.

Further, according to the present invention, in contrast to the deteriorating high frequency component on a spectrum of recording data as shown in FIGS. 3A to 3F, the high frequency component of recording data can be detected without a deteriorating response thereto because it lies in the low frequency band of the detection optical system and the S/N of detection signal can be improved. This effect fulfils itself even for recording data.

We claim:

1. An optical information recording/reproducing method in which information is recorded on a rotary disk in an optically discriminative form, a light emitted from a light source is focused on the surface of said disk to form a light spot, said information is scanned with said light spot relative thereto in a rotating direction of said disk, and a reflection light or transmitting light from said disk is collected by an optical system to record or reproduce the information, said method comprising the steps of:

(a) recording information indicative of the product of first information having a spatial frequency component higher than that resolvable by said optical system and second information having a spatial frequency component higher than that resolvable by said optical system on the surface of said disk; and (b) converting a frequency component prepared from said information indicative of the product and being higher than said spatial frequency resolvable by said optical system into a spatial frequency component detectable by said optical system.

2. An optical information recording/reproducing method according to claim 1, wherein in step (a), an optically discriminative first information mark having a frequency higher than a spatial frequency resolvable by said optical system is recorded on the surface of said disk;

wherein in step (b), an optically discriminative second information mark having a frequency higher than the spatial frequency resolvable by said optical system is overwrite-recorded on said first information mark; and wherein said method further comprises the following step:

(c) converting a frequency component which is prepared from said first and second information marks, and which is higher than the spatial frequency resolvable by said optical system, into a spatial frequency component detectable by said optical system.

3. An optical information recording/reproducing method according to claim 2, wherein in step (a), said disk has a substrate on which rugged phase pits are formed in a pit array, and said first information mark is formed on the surface of said disk in synchronism with the pit array; and wherein in step (b), said second information mark is overwrite-recorded on said first information mark.

4. An optical information recording/reproducing method according to claim 2, wherein in step (a), said first information mark is prepared in the form of phase pits.

5. An optical information recording/reproducing method according to claim 2, wherein in step (b), a clock synchronous with said first information mark is generated, and said second information mark is overwrite-recorded using said clock.

6. An optical information recording/reproducing method according to claim 5, wherein said clock is detected from a phase pit array prepared on a medium substrate in advance.

7. An optical information recording/reproducing method according to claim 2, wherein, in step (b), a clock synchronous with said first information mark is generated, and said second information mark is detected using said clock.

8. An optical information recording/reproducing method according to claim 7, wherein said clock is detected from a phase pit array prepared on a medium substrate in advance.

9. An optical information recording/reproducing method according to claim 1, wherein, in step (b), a spatial frequency resolvable by said optical system is converted into a spatial frequency component detectable by a detector in said optical system to reproduce information.

10. An optical information recording/reproducing method according to claim 9, wherein, in step (b), converted outputs are synthesized through optical calculation, and light flux after the synthesis is collected to a small aperture on an image forming plane to reproduce recorded second information.

11. An optical information recording/reproducing method according to claim 9, wherein, in step (b), said optical system has means for shifting light flux, and said second information is reproduced by detecting shifted light flux.

12. An optical information recording/reproducing method according to claim 11, wherein, in step (b), said means for shifting light flux separates the light flux into at least two components and shifts each of the separated light flux components.

13. An optical information recording/reproducing method according to claim 9, wherein, in step (b), an output from said detector is discretely detected, and said second information is reproduced on the basis of a level of a discretely detected signal and a change in phase with time.

14. An optical information recording/reproducing method according to claim 9, wherein, in step (b), an output from said detector is discretely detected, a level of the discretely detected signal is discriminated, results of the discrimination are stored in a memory, and said second information is decoded on the basis of the results of storage in said memory.

15. An optical information recording/reproducing method according to claim 14, wherein, in step (b), a clock is generated from a clock signal recorded on said optical disk, and operations of the detection, storage and decoding are controlled by said clock.

* * * * *